March 9, 1926.
W. P. GAUGHAN
1,576,113
FRUIT GATHERER
Filed Sept. 13, 1923
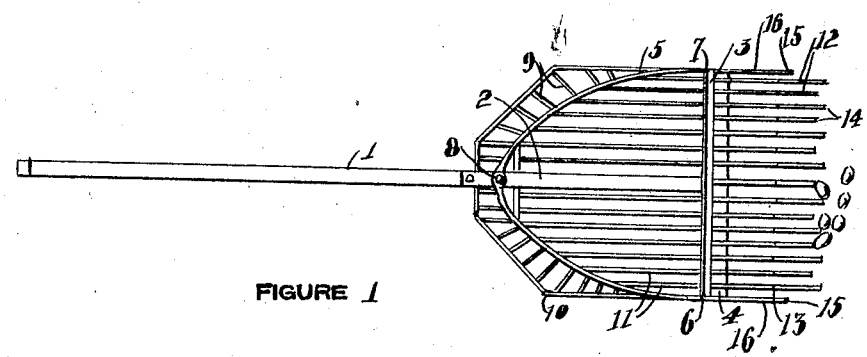
FIGURE 1
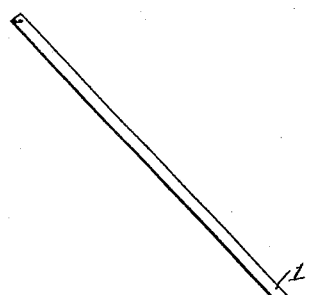
FIGURE 2
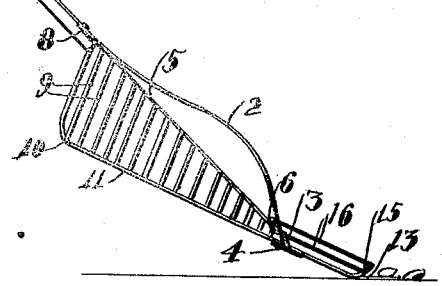
INVENTOR
William P. Gaughan
BY John A. Naismith
ATTORNEY Patented Mar. 9, 1926.

1,576,113

UNITED STATES PATENT OFFICE.

WILLIAM P. GAUGHAN, OF SAN JOSE, CALIFORNIA.

FRUIT GATHERER.

Application filed September 13, 1923. Serial No. 662,476.

*To all whom it may concern:*

Be it known that I, WILLIAM P. GAUGHAN, a citizen of the United States, and resident of San Jose, in the county of Santa Clara and State of California, have invented certain new and useful Improvements in a Fruit Gatherer, of which the following is a specification.

The invention relates particularly to that form of fruit and nut gatherers designed for use in gathering fruits and nuts after they have fallen upon the ground, reference being made particularly to prunes, walnuts etc.

It is one object of the invention to provide a device of the character indicated that can be easily operated by an adult while standing erect.

It is another object of the invention to provide a device wherein the leaves, twigs etc. may be readily separated from the fruit or nuts gathered.

It is still another object of the invention to provide a device of the character indicated that will be simple in form and construction, economical to manufacture, easily operated and highly efficient in its practical operation.

In the drawing:

Figure 1 is a plan view of the device.

Figure 2 is a side elevation of the same.

Referring more particularly to the drawing, 1 indicates a handle upon which is mounted a supporting strap 2 carrying a cross bar 3 at its outer end, the said bar 3 having a plate 4 mounted upon its lower edge and forming an integral part thereof.

At 5 is a rod bent in the form shown with its two ends secured to the two ends of bar 3 as at 6 and 7 and secured at its center to handle 1 as shown at 8.

To the rod 5 above described are suspended a plurality of spaced wires 9 of gradually decreasing length from the rear to the front and joined at their lower ends by a rod 10. A plurality of spaced parallel wires 11 connect the plate 4 with the central portion of rod 10 thereby forming the bottom of a basket.

Extending forwardly from plate 4 and substantially in alignment with bottom wires 11 are a plurality of steel wire teeth 12. At a suitable distance from the plate 4 these teeth 12 are bent upwardly at a slight angle to the plane of the bottom 11 as indicated at 13 so that when the instrument is in use this bent end portion lies flat on the ground as shown. The teeth 12 vary in length, being alternately long and short as indicated at 14. The two end teeth 15—15 are somewhat shorter than the rest and bent upwardly to support end wires 16 which are attached thereto and to rod 5 as shown. The supporting strap 2 is curved sharply upward at its front end in order not to interfere with the handling of the fruit in the device.

In use the operator may stand erect and gather a few prunes, nuts, or whatever crop is being harvested on the teeth 12, the varying length of the teeth facilitating the picking up of the fruit because the longer teeth will turn the fruit so that two teeth will pick it up at an angle instead of tending to roll it forwardly as would be the case if the teeth were all of the same length.

Having collected a quantity of fruit on the teeth by moving the device forwardly in contact with the ground, a jerking movement of the whole device will throw the fruit over the low bar 3 into the basket, leaves and other débris falling between the wires 11 back to the ground. When this operation has been repeated one or more times the fruit gathered into the basket is emptied into a box and the operation repeated.

It may be readily seen from the foregoing that I have provided a device that is simple, economical and efficient. By placing the bar 3 upright or at a slight angle to a vertical plane passing longitudinally through its lower edge it serves to retain the fruit or nuts in the basket while more fruit is being gathered and thrown into the basket.

It is to be understood, of course, that while I have herein disclosed one specific embodiment of my invention, changes may be made within the scope of the claim.

I claim:

A fruit gatherer comprising a handle having a supporting strap extending forwardly therefrom, a cross-bar mounted on the free end of said strap, a plate mounted upon the lower edge of said bar and extending throughout its length, a basket mounted on said handle and plate, and a plurality of teeth extending forwardly of said basket and cross-bar.

WILLIAM P. GAUGHAN.